(12) United States Patent
Muradov et al.

(10) Patent No.: US 7,299,555 B2
(45) Date of Patent: Nov. 27, 2007

(54) THREAD GAUGING SYSTEM AND METHOD

(75) Inventors: Andrei Muradov, Houston, TX (US); Michael Jellison, Houston, TX (US)

(73) Assignee: Grant Prideco, L.P., Houston, TX (US)

( * ) Notice: Subject to any disclaimer, the term of this patent is extended or adjusted under 35 U.S.C. 154(b) by 0 days.

(21) Appl. No.: 11/276,987

(22) Filed: Mar. 20, 2006

(65) Prior Publication Data

US 2007/0214664 A1    Sep. 20, 2007

(51) Int. Cl.
*G01B 3/48* (2006.01)
(52) U.S. Cl. .................................... 33/199 R
(58) Field of Classification Search ............... None
See application file for complete search history.

(56) References Cited

U.S. PATENT DOCUMENTS

| 3,284,913 | A | * | 11/1966 | Satava ................... 33/199 R |
| 4,479,306 | A | | 10/1984 | Klementich |
| 4,856,198 | A | * | 8/1989 | Hattan et al. ............ 33/199 R |
| 5,490,333 | A | * | 2/1996 | Nelson et al. ........... 33/199 R |

FOREIGN PATENT DOCUMENTS

| DE | 3542229 A1 | 11/1985 |
| GB | 417299 | 10/1934 |

OTHER PUBLICATIONS

European Search Report for Application No. 07250921.9, Apr. 18, 2007.
Newman Tools Inc. Brochure, date unknown.

* cited by examiner

*Primary Examiner*—Christopher W Fulton

(57) ABSTRACT

A system and method are provided for gauging multi-start threads on an oilfield tubular connection include a pin member 12 and a box member 42. One or more external starting threads are successively gauged with a single thread ring gauge 22, and the same threads are simultaneously gauged with a multi-thread ring gauge 32. Each of two or more internal starting threads are successively gauged with a single thread plug gauge 52, and the same threads are simultaneously gauged with a multi-thread plug gauge 62.

14 Claims, 2 Drawing Sheets

THREAD GAUGING SYSTEM AND METHOD

FIELD OF THE INVENTION

The present invention relates to gauging of oilfield tubular threads. More particularly, the invention relates to a system and method of gauging multi-start threads with a combination of ring and plug gauges.

BACKGROUND OF THE INVENTION

Oilfield tubular threads typically are tapered threads on a pin member and a box member. The threads themselves may have various configurations, including a generally V-shaped or truncated V-shaped thread profile. Threads are typically tapered with respect to a central axis of the respective pin member or box member, such that the diameter of a pin thread slowly increases from a starting thread to an end thread, and similarly the diameter of the box thread slowly increases from a starting thread to an end thread. When oilfield tubular threads become worn, the threads are periodically recut or reformed to substantially conform to the original thread profile, thereby shortening the joint.

Ring and plug gauges have long been used to verify the accuracy of the threads machined on the pin member and box member. The ring gauge may thus be threaded onto a pin member, and when the gauge is hand-tight, an axial stand-off between a shoulder on the pin member and the end of the ring gauge is measured to verify that it conforms to allowable tolerances. Similarly, a plug gauge is conventionally threaded on a box member, and when the plug gauge is hand tight a stand-in is measured between an end of the box member and an end surface of the plug gauge. If measurements are within selected limits, the thread is passed for use.

In recent years, increased emphasis has been placed upon oilfield tubular threads which are multi-start threads. A dual start thread thus has two threads which typically start at circumferentially opposing locations on the pin member and the box member, with one thread being axially spaced between the other thread. In cross-section, the double-start thread on a pin member thus closely resembles a conventional single-start thread on a pin member, although in practice the double-start thread would typically make up with half the number of revolutions, thereby saving considerable rig time. Threads with three or more starts on the pin member and the box member have also been proposed. Threads with two or more starting points are considered multi-start threads.

While multi-start threads on oilfield tubular goods have been proposed for years, conventional gauging techniques have not been able to reliably test such threads. Double-start threads have previously been tested with a double-start ring gauge and a double-start plug gauge, and these gauges will result in a stand-off or stand-in as discussed above which can be measured to determine if this dimension falls within accepted limits. A significant problem, however, is that a double-start gauge may result in an acceptable stand-in or stand-off using a double start thread, but one or both of the double-start threads may still be out of tolerance even though the double-start gauge results in an acceptable stand-off and stand-in.

U.S. Pat. No. 4,356,636 discloses a gauge for a tapered threaded box of an oilfield tubular connection. U.S. Pat. No. 5,134,783 discloses thread timing for a ring gauge and a plug gauge.

The disadvantages of the prior art are overcome by the present invention, and an improved method and system are hereinafter disclosed for gauging two or more external starting threads on a pin member and two or more internal starting threads on a box member.

SUMMARY OF THE INVENTION

According to one embodiment, a method of gauging multi-start threads on an oilfield tubular connection including a pin member having two or more external starting threads and a box member having two or more internal starting threads comprises successively gauging each of the two or more external starting threads with a single thread ring gauge, and simultaneously gauging each of the two or more external starting threads with a multi-thread ring gauge. The method also includes successively gauging each of the two or more internal starting threads with a single thread plug gauge, and simultaneously gauging each of the two or more internal starting threads with a multi-thread plug gauge.

These and further features and advantages of the present invention will become apparent from the following detailed description, wherein reference is made to the figures in the accompanying drawings.

DETAILED DESCRIPTION OF PREFERRED EMBODIMENTS

Figure 1:
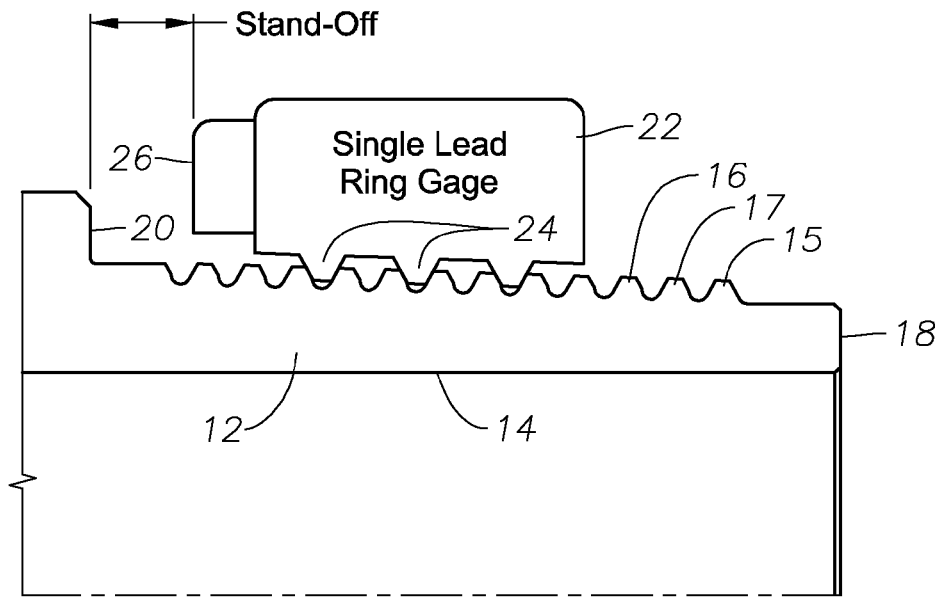
FIG. 1 illustrates in cross-section the double-start thread on an oilfield tubular pin member and a single thread ring gauge with a measurable stand-off between the ring gauge and a shoulder on the pin member.

FIG. 1 illustrates in cross section an oilfield connection pin member 12 having a cylindrical bore 14, tapered external threads 16, a pin end surface 18, and a pin shoulder 20. The threads 16 are double-start threads, with a starting point for thread 15 offset by approximately 180° from the starting point for thread 17. FIG. 1 also illustrates a single lead or single thread ring gauge 22 with a plurality of threads 24 which mate with the grooves between one starting thread and the other starting thread. FIG. 1 depicts three threads on the ring gauge 22, with each thread occupying the groove space between alternative threads 16.

As shown in FIG. 1, the ring gauge 22 has been threaded on the connection 12 to a hand tight position. At this position, an axial spacing or stand-off between a reference surface 26 on the ring gauge 22 and the pin shoulder 20 on member 12 may be measured to determine if the stand-off is within acceptable limits. Assuming this measured standoff is acceptable, the ring gauge 22 may be threaded off the pin member 12, and the same or another ring gauge threaded onto the other thread, so that in this case the teeth 24 of the ring gauge will engage the thread grooves between the threads 24 shown in FIG. 1. Again, the stand-off between the reference surface on the ring gauge and the shoulder surface 20 may be measured to determine if the second thread is also within acceptable limits.

Figure 2:
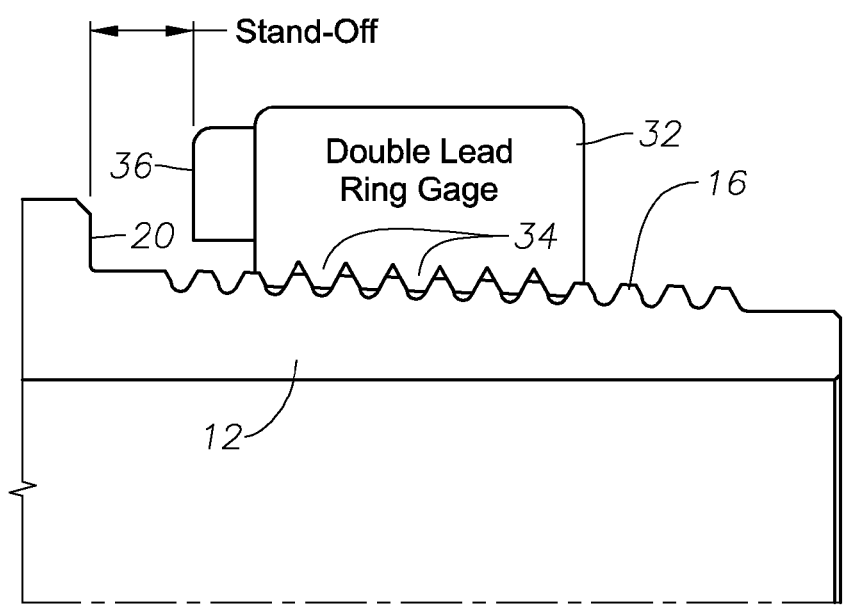
FIG. 2 illustrates the pin member as shown in FIG. 1 with a double-thread ring gauge and a measurable stand-off between the double-thread ring gauge and the shoulder on the pin member.

Each of the dual external starting threads 16 on the pin member 12 may also be simultaneously gauged with a multi-thread ring gauge 32, which in this case includes teeth 34 as shown in FIG. 2 which occupy each of the grooves between the threads. When the double-lead ring gauge 32 is hand tight, the stand-off between the reference surface 36 and the shoulder 20 may again be measured to determine if this standoff is within acceptable limits. If each of the three tests discussed above on the connection 12 produces an acceptable stand-off, the double-start thread on the pin member may be assumed to be within tolerance.

Figure 3:
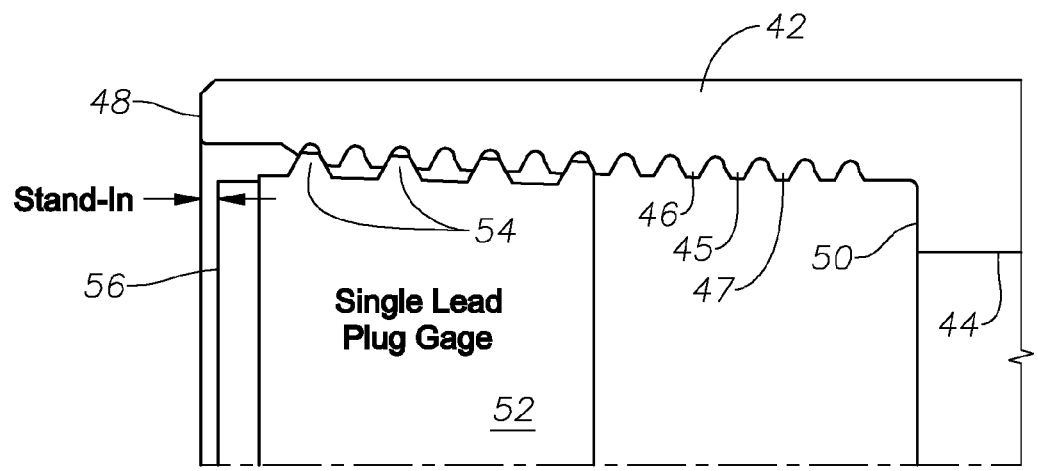
FIG. 3 illustrates in cross section, a double-start thread on a tubular box member, and a single thread plug gauge on one of the internal threads, with a measurable stand-in between an end face of the box member and a reference surface on the plug gauge.

A similar operation may be used to test the box member 42 shown in FIG. 3, which also has an internal bore 44 preferably aligned with and having the same diameter as the bore 14 in the pin member. The internal threads 46 are also double-start threads, and the starting point for the thread 45 is thus offset by approximately 180° from the starting point for the thread 47. The end surface 48 of the box member may be configured for engaging the shoulder 20 on the pin member, and the shoulder 50 on the box member may be spaced to be in engagement or close to engagement with the end surface 18 on the pin member.

As shown in FIG. 3, the single-thread plug gauge 52 is threaded to the connection, with threads 54 occupying every other one d the grooves of the double-start thread. Once the plug gauge 52 is hand tight, the stand-in may be measured between a reference surface 56 on the plug gauge and the end surface 48 of the box connection to determine if the stand-in is within acceptable limits.

The same or another plug gauge may then be used to test the other thread on the double-start thread on the box connection 42, with the threads of the plug gauge engaging the grooves spaced between the grooves engaged by the threads 54 as shown in FIG. 3. When the plug gauge is hand tight, the axial spacing or stand-in between the surfaces 48 and 56 may again be measured to determine whether the stand-in is between acceptable limits.

Figure 4:
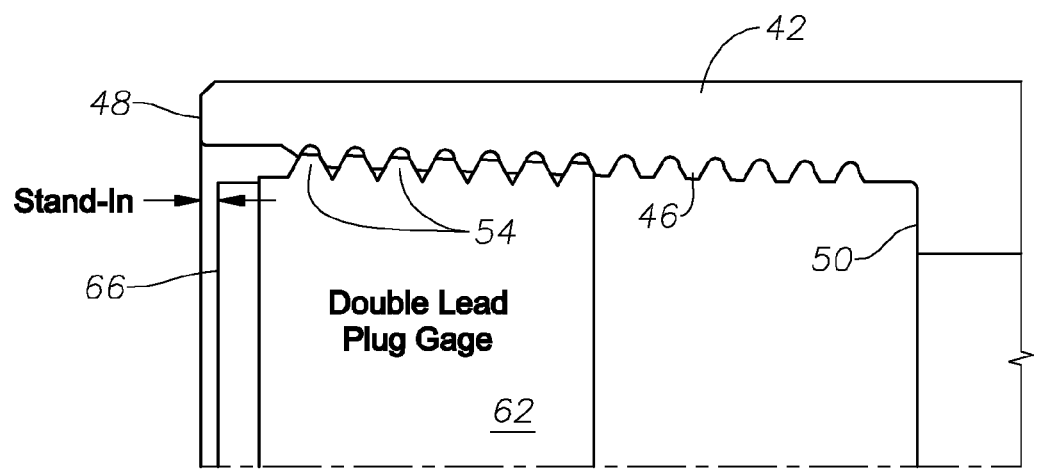
FIG. 4 illustrates the box member shown in FIG. 3 with a double-thread plug gauge and a reference stand-in between an end surface on the box member and the plug gauge.

Lastly, a double-lead plug gauge 62 as shown in FIG. 4 may be threaded to the box connection 42, with the teeth 54 on the double-lead plug gauge occupying each of the grooves between the threads, as shown in FIG. 4. When the double-thread plug gauge has been made up to a hand tight position, the axial spacing between the surfaces 48 and 66 may be measured to assure that the stand-in is within acceptable limits.

Those skilled in the art should appreciate that any desired sequence may be used for successively gauging each of the two or more external starting threads on the pin member with a single thread ring gauge, and previously or subsequently thereto simultaneously gauging each of the two or more external starting threads with a multi-thread ring gauge. Similarly, a single thread plug gauge may be used for successively gauging each of the two or more internal starting threads on a box member in any desired order, and previously or subsequently thereto simultaneously gauging each of two or more internal starting threads with the multi-thread plug gauge. The sequence for performing these operations is thus not critical, although obtaining the measured standoff or stand-in with both single thread and multi-thread gauges is critical.

In a preferred embodiment, each of the pin member and box member are a tool joint, with a pin member including a shoulder for engagement with the mating shoulder on the box member. Each gauge may thus have a selected axial spacing from the respective shoulder when threaded hand-tight to a respective pin member or box member. The axial spacing between the reference surface on the pin member and the reference surface on each of the single thread ring gauge and the multi-thread ring gauge determine if the external threads are acceptable, and the measured axial spacing between the reference surface on the box member and reference surface on each of the single thread plug gauge and the multi-thread plug gauge determine if the internal thread is acceptable.

Each of the single thread ring gauge and the single thread plug gauge test thread diameter, thread taper, and thread lead. Each of the multithread ring gauge and the multi-thread plug gauge may each verify the lead between threads. In a preferred embodiment, the threads on the pin member and the box member each have a generally V-shaped profile, which includes a truncated V-shaped thread profile.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A method of gauging multi-start threads on an oilfield tubular connection including a pin member having two or more external starting threads and a box member having two or more internal starting threads, the method comprising:
   successively gauging each of the two or more external starting threads with a single thread ring gauge;
   simultaneously gauging each of the two or more external starting threads with a multi-thread ring gauge;
   successively gauging each of the two or more internal starting threads with a single thread plug gauge; and
   simultaneously gauging each of the two or more internal starting threads with a multi-thread plug gauge.

2. The method as defined in claim 1, wherein each of the pin member and the box member are a tool joint.

3. The method as defined in claim 2, wherein the pin member includes a shoulder for engagement with a mating shoulder on the box member.

4. The method as defined in claim 3, wherein each of the single thread ring gauge, the multi-thread ring gauge, the single thread plug gauge and the multi-thread plug gauge have a selected axial spacing from a respective shoulder when threaded hand-tight to the respective pin member or box member.

5. The method as defined in claim 1, wherein the single thread ring gauge and the single thread plug gauge each gauge thread diameter, thread taper, and thread lead.

6. The method as defined in claim 1, wherein each of the multithread ring gauge and multi-thread plug gauge each verify the lead between threads.

7. The method as defined in claim 1, wherein an axial spacing between a reference surface on the pin member and a reference surface on each of the single thread ring gauge and the multi-thread ring gauge determine if the external threads are acceptable.

8. The method as defined in claim 1, wherein an axial spacing between a reference surface on the box member and a reference surface on each of the single thread plug gauge and the multi-thread plug gauge determine if the internal thread is acceptable.

9. The method as defined in claim 1, wherein the threads on the pin member and the box member each have a generally V-shaped profile.

10. A method of gauging multi-start threads on an oilfield tubular connection including a pin member having two or more external starting threads and a box member having two or more internal starting threads, the method comprising:
successively gauging each of the two or more external starting threads with a single thread ring gauge;
simultaneously gauging each of the two or more external starting threads with a multi-thread ring gauge, an axial spacing between a reference surface on the pin member and a reference surface on each of the single thread ring gauge and multi-thread ring gauge determine if the external threads are acceptable;
successively gauging each of the two or more internal starting threads with a single thread plug gauge; and
simultaneously gauging each of the two or more internal starting threads with a multi-thread plug gauge, an axial spacing between a reference surface on the box member and a reference surface on each of the single thread plug gauge and the multi-thread plug gauge determine if the internal thread is acceptable.

11. The method as defined in claim 10, wherein the single thread ring gauge and the single thread plug gauge each gauge thread diameter, thread taper, and thread lead.

12. The method as defined in claim 10, wherein each of the multi-thread ring gauge and multi-thread plug gauge each verify the lead between threads.

13. The method as defined in claim 10, wherein the pin member includes a shoulder for engagement with a mating shoulder on the box member.

14. The method as defined in claim 13, wherein each of the single thread ring gauge, the multi-thread ring gauge, the single thread plug gauge and the multi-thread plug gauge have a selected axial spacing from a respective shoulder when threaded hand-tight to the respective pin member or box member.

* * * * *